S. J. KOSHT & J. A. PETRILLA.
ANTISKID TIRE DEVICE.
APPLICATION FILED MAR. 15, 1918. RENEWED FEB. 7, 1919.
1,297,869.
Patented Mar. 18, 1919.
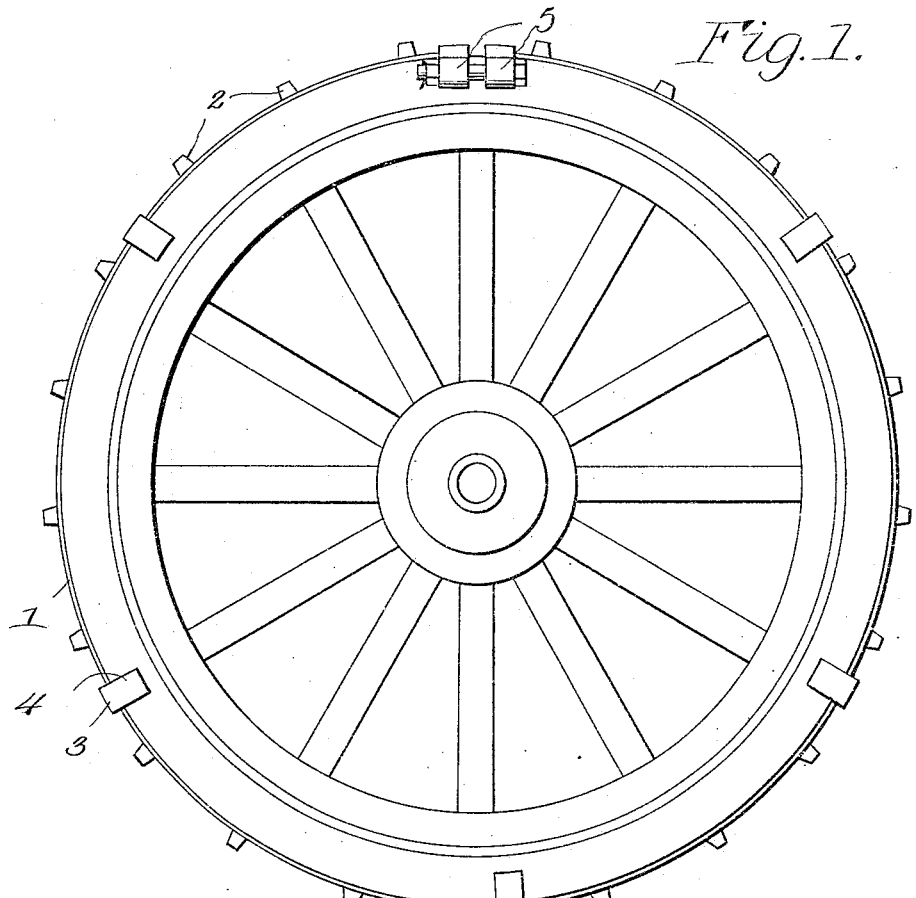
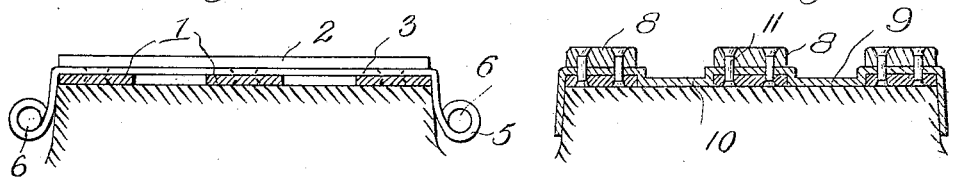
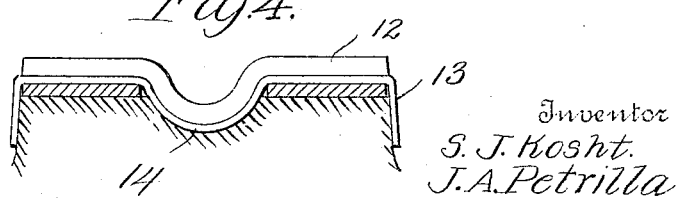
Witnesses
Wm. P. Smith
Inventor
S. J. Kosht.
J. A. Petrilla
By Victor J. Evans
Attorney

UNITED STATES PATENT OFFICE.

STEPHEN J. KOSHT AND JOHN A. PETRILLA, OF PITTSBURGH, PENNSYLVANIA.

ANTISKID TIRE DEVICE.

1,297,869.     Specification of Letters Patent.     Patented Mar. 18, 1919.

Application filed March 15, 1918, Serial No. 222,680. Renewed February 7, 1919. Serial No. 275,680.

*To all whom it may concern:*

Be it known that we, STEPHEN J. KOSHT and JOHN A. PETRILLA, citizens of the United States, residing at Pittsburgh, in the county of Allegheny and State of Pennsylvania, have invented new and useful Improvements in Antiskid Tire Devices, of which the following is a specification.

This invention relates to an anti-skid device for tires and has for its primary object to provide a substantial construction that is capable of withstanding the rough usage when the device is used upon motor truck tires.

An object of the invention is to provide a device that may be quickly fastened to a tire and when in place will be held against movement in any direction.

Another object of the invention is to provide an anti-skid device of such a construction that it will be readily formed into a shape to conform to the peripheral surface of a tire.

With these and other objects in view the invention will be better understood from the following detailed description taken in connection with the accompanying drawing wherein:

Figure 1 is a side elevation of a wheel and tire showing our invention applied thereto.

Fig. 2 is a sectional view through that form of anti-skid device illustrated in Fig. 1.

Figs. 3 and 4 are sectional views through modified forms of our invention.

Referring more particularly to Figs. 1 and 2 of the drawing the numeral 1 designates a plurality of bands encircling the tread of the tire and of the proper resiliency to allow the same to be readily placed in position. Effectively binding these bands together are calks 2 fastened to the bands transversely across the tread of the tire. These calks may be secured to the bands in any suitable manner found necessary in practice. Secured to the bands at spaced intervals are clips 3 shaped to have angularly disposed end portions 4 engaging the sides of the tire while those clips arranged at the ends of the band are further looped as indicated at 5 to form openings 6 for the passage of tightening bolts 7.

From this construction it will be seen that the device may be effectively sprung into a position upon the tire and then effectively forced into tight engagement with the periphery of the tire by tightening on the bolts 7. By this arrangement any degree of pressure may be accomplished between the bands and the periphery of the tire while the formation of the clip prevents movement of the device laterally of the tire.

The construction illustrated in Fig. 3 is identical with that I have just described with the exception that I provide independent calks for each band and the clip 9 is of a formation to engage one side and two edges of the band as illustrated at 10, while rivets 11 pass through the calks, clip and bands. By this construction it will be seen that the bands are effectively held against displacement and excessive strain upon one band will be transmitted to all the bands proportionately. In Fig. 4 the calk 12 and clip 13 are of a shape to conform to that type of tire having a central groove 14. This is a very important feature of my invention as the device may be made of any shape to effectively engage the periphery of any shaped tire.

It is to be understood that the structural embodiment of the invention as a whole and its various features as shown are merely illustrative and not restrictive, since I am well aware that many of the details of construction can be widely varied without departing from the spirit of the invention. I therefore do not desire to be limited in these particulars or in any other, except as set forth in the appended claim.

Having described our invention, what we claim is:

An anti-skid device for tires comprising circular bands for engagement with the periphery of a tire, clips extending transversely across the bands and having their ends turned down to engage the sides of the tire, calks arranged on the clips, and securing elements passing through the calks, clips and bands, each of said clips having its intermediate portion bent to embrace the bands and thereby preventing movement of the bands when in place.

In testimony whereof we affix our signatures.

STEPHEN J. KOSHT.
JOHN A. PETRILLA.

Copies of this patent may be obtained for five cents each, by addressing the "Commissioner of Patents, Washington, D. C."